(12) United States Patent
Svabek et al.

(10) Patent No.: US 7,383,963 B2
(45) Date of Patent: Jun. 10, 2008

(54) IN-FRAME WIRE FRY BASKET

(75) Inventors: Lawrence J. Svabek, Orland Park, IL (US); Leonard J. Svabek, Orland Park, IL (US); Richard J. Svabek, Lemont, IL (US)

(73) Assignee: Archer Wire International Corporation, Bedford, Park, IL (US)

( * ) Notice: Subject to any disclaimer, the term of this patent is extended or adjusted under 35 U.S.C. 154(b) by 699 days.

(21) Appl. No.: 10/862,713

(22) Filed: Jun. 7, 2004

(65) Prior Publication Data

US 2005/0269332 A1   Dec. 8, 2005

(51) Int. Cl.
*B65D 6/08* (2006.01)
*A47J 37/12* (2006.01)

(52) U.S. Cl. .......................... 220/485; 99/411
(58) Field of Classification Search ................ 220/485, 220/491; 99/411, 413, 416
See application file for complete search history.

(56) References Cited

U.S. PATENT DOCUMENTS

| | | | | | |
|---|---|---|---|---|---|
| 2,658,444 | A | * | 11/1953 | Wheeler | 99/410 |
| 3,371,950 | A | * | 3/1968 | Stap | 294/15 |
| 3,380,376 | A | * | 4/1968 | Preis | 99/413 |
| 5,992,306 | A | * | 11/1999 | Chiang | 99/411 |
| 6,176,175 | B1 | * | 1/2001 | Moreth | 99/408 |

* cited by examiner

*Primary Examiner*—Anthony D. Stashick
*Assistant Examiner*—Harry A Grosso
(74) *Attorney, Agent, or Firm*—Ladas & Parry LLP

(57) ABSTRACT

A rigid wire frame is formed around the exterior of a wire mesh fry basket. The rigid wire frame is shaped as an inverted frusto-pyramid. The inverted frusto-pyramid allows the baskets to be stacked together. A rigid wire hook, opposite a rigid wire handle enables the basket to be hung from an edge. The rigid wire frame protects the wire mesh fry basket from damage.

10 Claims, 3 Drawing Sheets

IN-FRAME WIRE FRY BASKET

BACKGROUND OF THE INVENTION

Wire mesh baskets are used to dry fry food. Prior art wire fry baskets are comprised of three components: a relatively fine-mesh wire basket; a frame to which the mesh basket is attached and a handle by which the mesh basket, suspended on the frame, can immersed into and removed from a hot oil bath. Such baskets have been used for years and are nearly ubiquitous in restaurants and food service institutions.

A problem with prior art wire baskets is the susceptibility of the wire mesh basket to physical damage. Because the mesh basket's sides and corners are unprotected, the mesh basket can be bent or dented if the basket is dropped or is otherwise not handled properly. A wire fry basket that protects the wire mesh basket would be an improvement over the prior art.

SUMMARY OF THE INVENTION

An improved wire fry basket has a wire mesh basket into which foods to be fried are placed. The exterior edges of the relatively fine wire mesh basket, i.e., the top, bottom and corners, are protected by rigid wire frames at the top and bottom edges of the wire mesh basket.

A rigid wire frame, into which the mesh basket is mounted, is formed from stiff, heavy gauge wire. The rigid wire frame has an upper or top rigid wire frame that essentially surrounds the opening of the mesh basket into which foods are placed for frying.

A lower or bottom, rigid wire frame surrounds the bottom edges of the wire mesh basket. Rigid wire corner segments that extend between the upper and lower, rigid wire frames, protect the corner edges of the wire mesh basket.

The in-frame wire fry basket can be lowered into or raised from a deep fryer by way of a rigid wire handle. A rigid-wire hook opposite the handle enables the basket to be hung above a deep fryer oil bath. The rigid wire hook and the rigid wire handle are preferably formed from the rigid wire that forms the rigid wire frame. In an alternate embodiment, the handle and/or the hook is attached to the rigid wire frame by welding.

DETAILED DESCRIPTION OF THE PREFERRED EMBODIMENT

Figure 1:
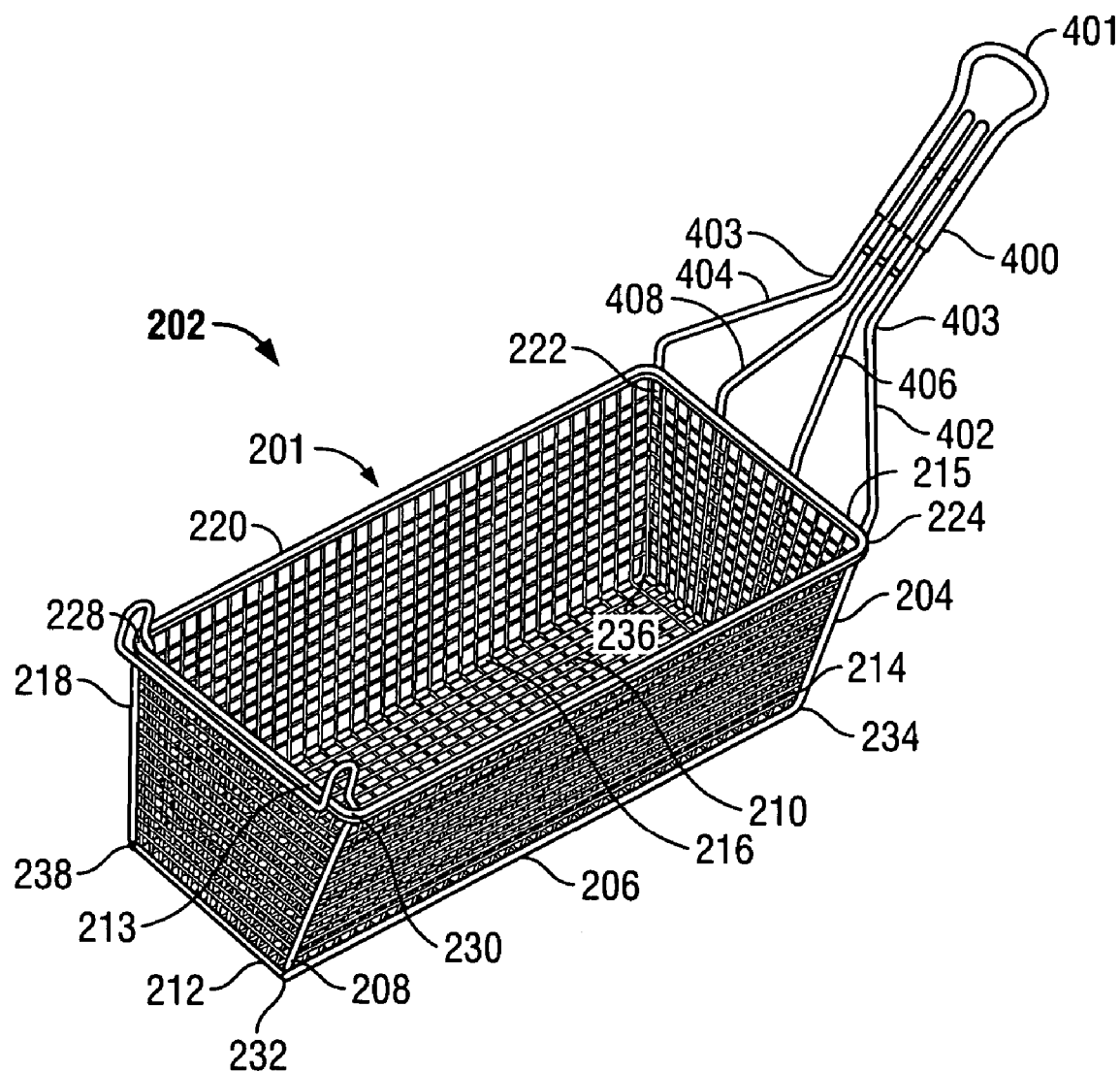
FIG. 1 shows a side elevation of the rigid wire from which the fry basket is made, including the rigid wire handle and the rigid wire hook.

FIG. 1 shows a side elevation view of an in-frame, wire fry basket 200.

The wire basket is made up of a substantially rectangular, frusto-pyramidal rigid wire frame 202, a wire mesh basket 300 and a rigid wire handle 400. The wire mesh basket 300, which is formed using relatively fine mesh wire, is protected from damage by being located within the frame 202, which is constructed of rigid wire or rod. The handle 400 enables the wire mesh basket 300 within the frame 202 to be lowered into and removed from hot, deep-fryers. The hook 600, which is also formed of the rigid wire from the frame 202 is constructed, it located on the top of the basket and opposite the wire handle 400 so that the basket 200 can be lifted and hung using the hook 600. In a preferred embodiment, the handle 400 and portions of the frame 202 are formed from a common length of rigid wire that forms part of the frame 202. In an alternate embodiment, the handle can be welded to the frame 202.

Figure 2:
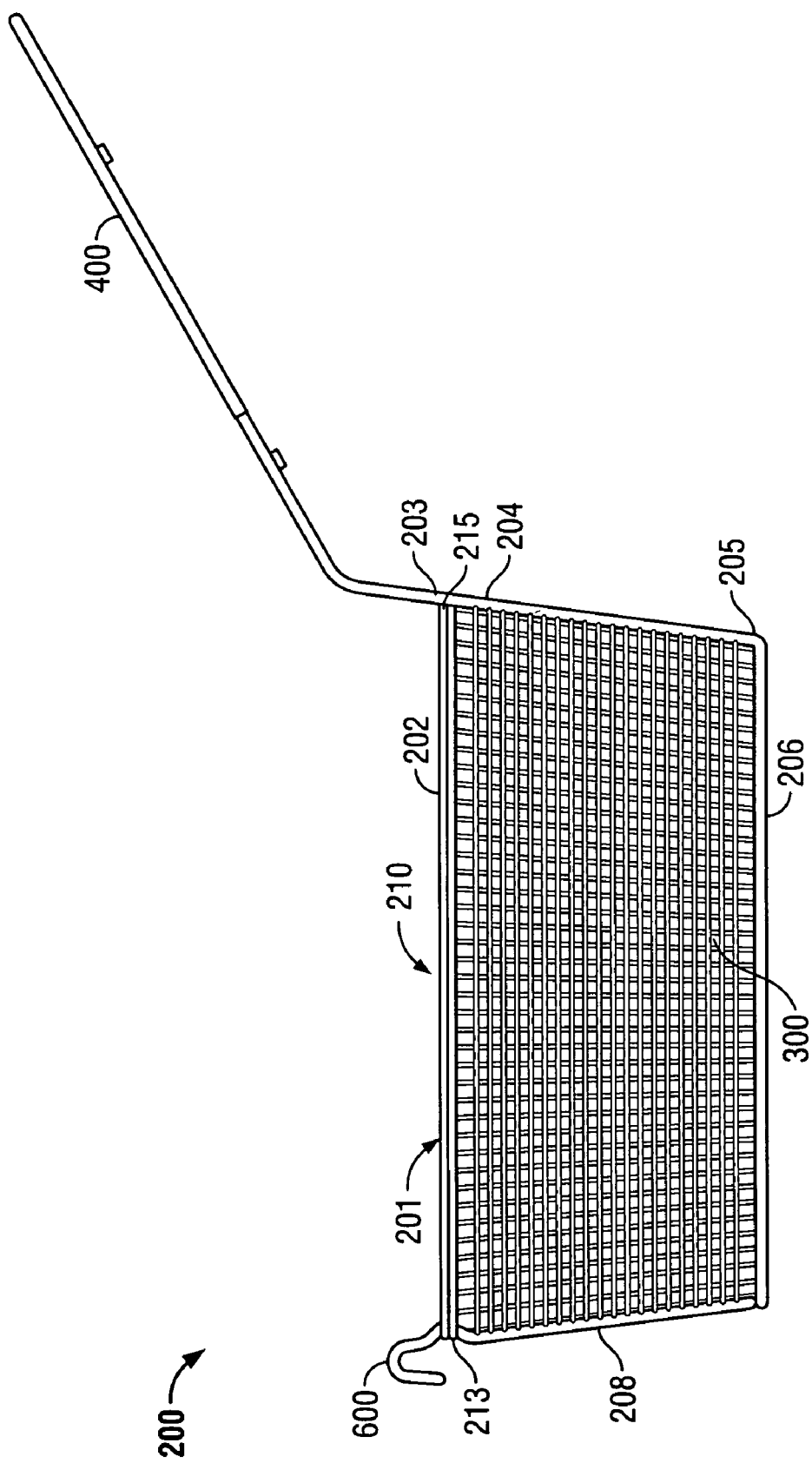
FIG. 2 shows a perspective view of an in-frame wire fry basket.

FIG. 2 shows an isometric view of the wire fry basket 200 but with the wire mesh basket 300 removed from the frame so as to show the rigid wire frame 202, the hook 600 and handle 400 in greater detail. The frame 202 (as well as the wire mesh basket) has the shape of an inverted rectangular, frusto-pyramid. The frusto-pyramid is referred to as "inverted" because it has its broader or wider base at the top of the basket 200 forming the opening 201 through which foods can be dropped into the basket 200.

Shaping the basket as an inverted frusto-pyramid allows two or more of the baskets 200 to be stacked inside and on top of each other by placing the relatively narrow bottom of one basket into the relatively wide-open top of another. Stackability of the baskets makes them easier to ship, clean and store after use.

The rigid wire frame 202 is made in an inverted frusto-pyramid by fabricating an upper, rigid wire rectangular frame to have its dimensions slightly larger than the corresponding dimensions of a lower, rigid wire rectangular frame.

As shown in FIG. 2, an upper, rigid-wire rectangular frame 203 is considered to be made up of first and second, opposing rigid-wire sides 210 and 220 that are each substantially orthogonal to two, or "first and second" opposing rigid wire ends 213 and 215. The space or distance between the opposing, rigid wire sides 210 and 220 is considered to be a "first interior dimension" or a "first distance." The first interior dimension is determined by the distance between the opposing rigid wire segments from which the rigid wire sides 210 and 220 are made. The space or distance between the opposing rigid wire ends 213 and 215 is considered to be a "second interior dimension" or a "second distance" and is determined by the distance between the rigid wire from which the rigid wire ends 213 and 215 are fabricated.

The first and second opposing rigid wire sides 210 and 220 intersect with the opposing rigid wire ends 213 and 215 at substantially right angles to form four, separate corners 224, 226, 228 and 230 of the upper frame 203. In one embodiment, the separate corners 224, 226, 228 and 230 are formed by bending a single length of rigid wire from which the opposing sides 210 and 220 and the opposing ends 213 and 215 are formed. In an alternate embodiment, the opposing sides 210 and 220 and the opposing ends 213 and 215 are welded or brazed. Whether the opposing sides 210 and 220 and the opposing ends 213 and 215 are formed by bending a single length of rigid wire or are formed from several pieces that are welded or brazed together, the upper frame 203 has four corners formed by the intersections of the first and second opposing sides 210 and 220 with the first and second opposing ends 213 and 215. The corners are referred to as rigid wire corners because the corners are formed from rigid wire. The corners are identified in FIG. 2 by reference numerals 224, 226, 228 and 230.

Still referring to FIG. 2, it can be seen therein that the rigid wire frame 202 of the fry basket also has a lower, rigid-wire frame that is considered to be made up of third and fourth opposing rigid-wire sides 206, 216 that are also substantially orthogonal to third and fourth opposing rigid wire ends 212 and 214.

Like the upper rigid-wire frame 203, there is a space or distance between the third and fourth opposing, rigid wire sides 206 and 216 of the lower frame 205. The spacing between the third and fourth opposing rigid wire sides 206 and 216 of the lower frame 205 is considered to be a "third interior dimension" or a "third distance" of the lower frame 205 and is determined by the distance between the rigid wire from which the rigid wire sides 206 and 216 are fabricated. A fourth interior dimension or a "fourth distance" is determined by the distance between the rigid wire from which the third and fourth opposing rigid wire ends 212 and 214 of the lower frame 205 are fabricated.

Like the first and second opposing rigid wire sides 210 and 220 and their intersections with the first and second opposing rigid wire ends 213 and 215, the third and fourth opposing rigid-wire sides 206 and 216 intersect with the third and fourth opposing rigid wire ends 212, 214 to fourth form four separate corners 232, 234, 236 and 238 of the lower frame 205.

Like the corners of the upper frame 203, the corners 232, 234, 236 and 238 of the lower frame 205 can be formed by either bending a single length of rigid wire, from which the opposing sides 210 and 220 and the opposing ends 213 and 215 are formed or in an alternate embodiment, by welding separate pieces or lengths of rigid wire.

The upper rigid wire frame 203 and the lower rigid wire frame 205 are substantially the same shape. When they are spaced apart from each other and fixed in substantially parallel planes, they form the frame of an inverted, substantially rectangular, regular frusto-pyramid shape. The frusto-pyramidal shape results from selecting the lengths of the third and fourth opposing ends 212 and 214 to be less than the lengths of the first and second opposing ends 213 and 215 so as to make the third interior dimension (in the lower frame 205) to be less than the first interior dimension (of the upper frame 203). Similarly, the third and fourth opposing sides 206 and 216 are shorter than the first and second opposing sides 210 and 220 so as to make the fourth interior dimension (in the lower frame) to be less than the second interior dimension (in the upper frame).

The frusto-pyramid shape is completed by having each of the corners of the upper frame 203 and the lower frame 205 joined by corresponding corner segments 204, 208, 218 and 222. Each one of these corner segments 204, 208, 218 and 222 extends from one corner in the lower frame 205 to a corresponding single corner in the upper frame or vice versa.

FIG. 2 shows a handle 400 that extends away from the inverted frusto-pyramidal shaped rigid wire basket 200. Like the frames 203, 205 and the corner segments 204, 208, 218 and 222, the handle 400 is preferably formed from rigid wire. In at least one preferred embodiment, the handle is formed from a length of rigid wire from which at least one corner segment is formed.

The handle 400 in the preferred embodiment is formed to have four separate wire segments 402, 404, 406 and 408. Alternate embodiments can have less than but also more than four wire segments in the handle 400.

The outer segments 402 and 404 of the handle 400 are formed by bending a single length of rigid wire, the bend of which is at the distal end 401 of the handle 400. These two outer segments 402 and 404 are parallel to each other to an inflection point 403 whereat the outer segments diverge away from each other and extend to intersect the corners 224 and 226.

When the rigid wire segment that forms the outer wire segments 402 and 404 of the handle extend away from the inflection points 403, they can be used to form part of the basket upper and/or lower frames 203 and 205.

In one embodiment, the rigid wire that forms the outer segments 402 and 404 can be either bent "downward" toward the corners 234 and 236 such that the rigid wire of the handle forms one or more corner segments. In an alternate embodiment, the rigid wire that forms the outer segments 402 and 404 can be bent forward toward the corners 230 and 228. In yet another embodiment, the rigid wire that forms the outer segments 402 and 404 can be bent downward at the corners 224 and 226 to form the corner segments and at the lower corners 234 and 236, the same length of rigid wire can then be bent forward, toward the corners 232 and 238. In one of these embodiments, the rigid wire from which the handle 400 and its outer segments 402 and 404 is formed can be bent to be part of the upper frame 203. In the other embodiments, the rigid wire forms one or more of the corner segments but also part of the lower frame 205. If the wire segment from which the handle is formed is so formed, it is considered to form at least the first and second sides of at least one of, the rigid wire upper frame 203 and the rigid wire lower frame 205.

Finally, FIG. 1 and FIG. 2 show a rigid wire hook 600 located opposite the rigid wire handle 400. The hook 600, which is formed from the same rigid wire that the handle and frame is formed, allows the basket 200 to be hung over an edge. In the preferred embodiment, the hook 600 is bent from one or more segments of wire from the corner segments 208 and 218 are formed. In an alternate embodiment, the hook 600 can be attached to the upper frame 203 by welding or brazing.

Figure 3:
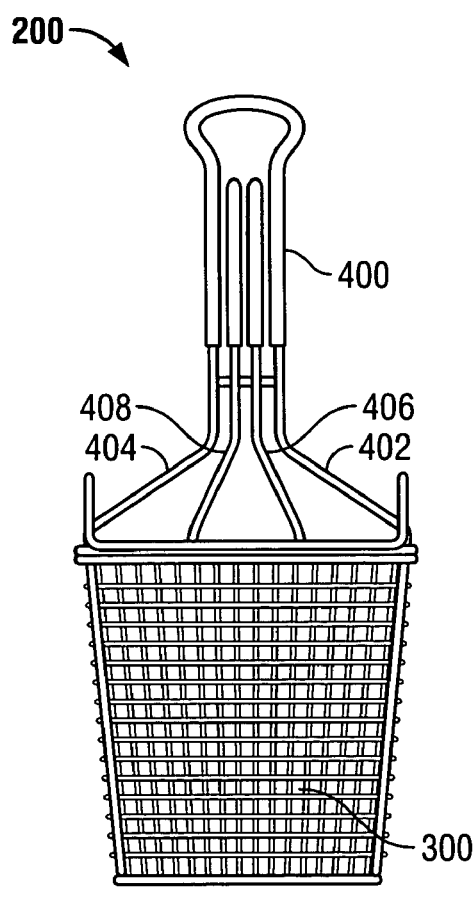
FIG. 3 shows a cut-away view of the basket shown in FIGS. 1 and 2.

FIG. 3 shows an end view of the in-frame wire fry basket as viewed from under the handle 400. Note that the intermediate rigid wire sections 406 and 408 continue along the underside of the basket.

Figure 4:
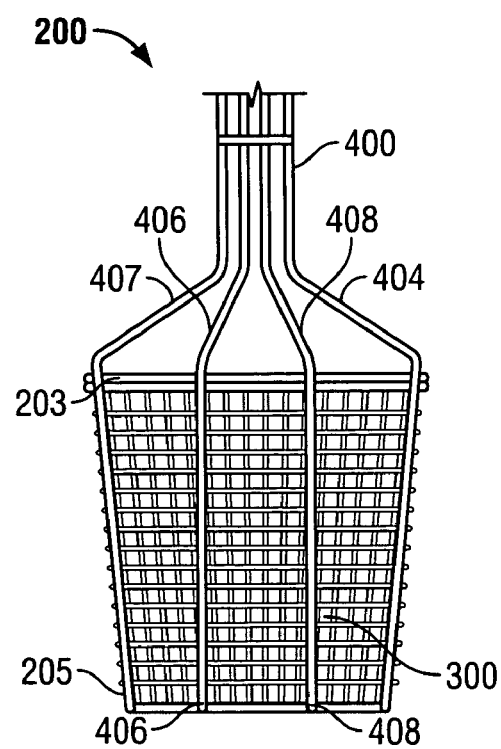
FIG. 4 shows an end view of the basket from under the handle.

FIG. 4 shows a cut-away view of the basket, looking toward the handle 400. As can be seen in FIGS. 3 4 the two other rigid wires 406 and 408 extend away from the handle to intersect one end 215 of the upper frame 203. These two rigid wires 406 and 408 strengthen or reinforce the handle.

In a preferred embodiment, the handle 400 extends away from the upper frame of the wire basket at an obtuse angle to the upper frame. Stated alternatively, the angle between the opening 201 of the basket and the handle 400 is more than 180 degrees. As shown in FIGS. 1 and 2, the handle's angle allows the basket to be safely lowered into and safely removed from hot, deep frying oil baths. The hook 600 allows the basket to be suspended on an edge. As a practical matter, the hook 600 keeps the fry basket 200 at or near the top of the oil bath used to fry foods.

As shown in FIGS. 1, 3 and 4, the relatively-fine wire mesh basket 300 is located inside the rigid wire frame members described above to form an inverted frusto-pyramid, in-frame wire fry basket. The wire mesh basket 300 is fabricated from wire and is sized and shaped to hold food items to be fried. The gauge of the wire from which the basket is formed is somewhat of a design choice as is the spacing between wire elements.

As a practical matter, the gauge of the wire from which the basket is formed is substantially smaller than the wire from which the frame is made. Those of ordinary skill in the art will appreciate that the rigid wire from which the frame and handle are made, provides a protective frame around the relatively weak wire mesh. The exterior frame protects the wire mesh basket from damage during its shipping, use, cleaning and storage.

What is claimed is:

1. A wire basket comprising:
an inverted rectangular, frusto-pyramidal rigid wire frame comprised of:
  a substantially-rectangular, rigid-wire upper frame having a first interior dimension between first and second opposing rigid wire sides and having a second interior dimension between first and second opposing rigid wire ends, intersections of the first and second sides and the first and second ends forming first, second, third and fourth rigid wire corners of said upper frame;
  a substantially-rectangular, rigid-wire lower frame having a third interior dimension between third and fourth opposing rigid wire sides and a fourth interior dimension between opposing third and fourth rigid wire ends, intersections of the third and fourth rigid wire sides and the third and fourth rigid wire ends forming corresponding first, second, third and fourth rigid wire corners of said lower frame, which correspond to the first, second, third and fourth wire corners of said upper frame, the third interior dimension being less than the first interior dimension and the fourth interior dimension being less than the second interior dimension;
a rigid handle having a predetermined length and being formed from a plurality of joined-together rigid wires, said rigid handle including a first continuous rigid wire that extends away from the rigid handle in a first direction, at a predetermined location along the length of the handle to form;
  a first corner segment of rigid-wire that extends between the first corner of the lower frame and the first corner of the upper frame;
said first continuous rigid wire extending away from the rigid handle in a second direction, opposite the first direction, at the predetermined location along the length the handle to form;
  a second corner segment of rigid-wire and that extends between the second corner of the lower frame and the second corner of the upper frame;
said basket further including:
  a third corner segment of rigid-wire and that extends from the third corner of the lower frame to the third corner of the upper frame; and
  a fourth corner segment of rigid-wire and that extends from the fourth corner of the lower frame to the fourth corner of the upper frame;
and an inverted rectangular, frusto-pyramidal wire mesh basket, sized and shaped to fit within the rectangular, frusto-pyramidal wire frame, said wire mesh basket being mounted within the inverted rectangular, frusto-pyramidal rigid wire frame such that the wire mesh basket is not removable there from.

2. The wire basket of claim 1 further comprising: a rigid wire hook, attached to the rigid wire upper frame.

3. The wire basket of claim 1 further comprising: a rigid wire hook, formed from the rigid wire that forms at least one corner segment.

4. The wire basket of claim 1 wherein the rigid wire handle is comprised of a plurality of rigid wires, and at least one of the rigid wires of the wire handle is bent to form a corner segment and bent to form a side of at least one of the upper frame and the lower frame.

5. The wire basket of claim 1 wherein the rigid wire handle is comprised of at least four, substantially co-planar rigid wire sections.

6. The wire basket of claim 5 wherein at least one of the four, substantially co-planar rigid wires is joined to at least one of the upper wire frame and the lower wire frame.

7. The wire basket of claim 1 wherein the rigid wire handle extends away from the upper frame of the wire basket at an obtuse angle to the upper frame.

8. The wire basket of claim 1 wherein the rigid wire handle extends away from the upper frame of the wire basket at an obtuse angle.

9. The wire basket of claim 1 further comprised of a rigid wire hook, attached to the rigid wire upper frame opposite the rigid wire handle and that is capable of suspending the wire basket.

10. The wire basket of claim 1 further comprised of a rigid wire hook, attached to the rigid wire upper frame and opposite the rigid wire handle, said rigid wire hook being sized and shaped to be capable of suspending the wire basket.

* * * * *